(12) United States Patent  
Byun et al.

(10) Patent No.: US 8,822,066 B2
(45) Date of Patent: Sep. 2, 2014

(54) SECONDARY BATTERY

(75) Inventors: Sangwon Byun, Yongin-si (KR); Jeongwon Oh, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 271 days.

(21) Appl. No.: 13/287,451

(22) Filed: Nov. 2, 2011

(65) Prior Publication Data

US 2013/0004831 A1    Jan. 3, 2013

(30) Foreign Application Priority Data

Jun. 30, 2011 (KR) ........................ 10-2011-0064237

(51) Int. Cl.
*H01M 2/26* (2006.01)
*H01H 37/00* (2006.01)
(52) U.S. Cl.
USPC ............ 429/161; 429/163; 429/164; 337/298
(58) Field of Classification Search
None
See application file for complete search history.

(56) References Cited

U.S. PATENT DOCUMENTS

| 4,188,460 A | 2/1980 | Kang et al. |
| 2010/0247989 A1 | 9/2010 | Kim |
| 2011/0183165 A1 | 7/2011 | Byun et al. |
| 2011/0183193 A1 | 7/2011 | Byun et al. |
| 2011/0300419 A1 | 12/2011 | Byun |

FOREIGN PATENT DOCUMENTS

| EP | 0 570 590 A1 | 11/1993 | |
| JP | 08-185850 A | 7/1996 | |
| JP | 10-214614 A | 8/1998 | |
| JP | 2001-148239 | * 5/2001 | ............. H01M 2/26 |
| JP | 2005-259574 | * 9/2005 | ............. H01M 2/30 |
| KR | 10-2000-0038817 A | 7/2000 | |
| KR | 10-1036070 B1 | 5/2011 | |
| KR | 10-1042808 B1 | 6/2011 | |
| KR | 10-1072956 B1 | 10/2011 | |
| KR | 10 2011-0133255 A | 12/2011 | |

OTHER PUBLICATIONS

Korean Notice of Allowance in KR 10-2011-0064237, dated Apr. 29, 2013 (Byun, et al.).

Search Report issued in corresponding European application, EP 12 15 6384, dated Oct. 11, 2012.

* cited by examiner

*Primary Examiner* — Cynthia K. Walls
(74) *Attorney, Agent, or Firm* — Lee & Morse, P.C.

(57) ABSTRACT

A secondary battery including an electrode assembly, the electrode assembly including a first electrode plate, a second electrode plate, and a separator between the first electrode plate and the second electrode plate; a first collecting plate electrically connected to the first electrode plate, the first collecting plate including a first fuse region; a second collecting plate electrically connected to the second electrode plate, the second collecting plate including a second fuse region; and a case accommodating the electrode assembly, the first collecting plate, and the second collecting plate, wherein a first sectional area of the first fuse region is larger than a second sectional area of the second fuse region.

20 Claims, 13 Drawing Sheets

SECONDARY BATTERY

BACKGROUND

1. Field

Embodiments relate to a secondary battery.

2. Description of the Related Art

Unlike primary batteries, which are not chargeable, secondary batteries are chargeable and dischargeable. Low-capacity batteries, which may include a pack having one battery cell, may be used for small portable electronic products, e.g., cellular phones, plasma display panels (PDPs), notebook computers, cameras, etc. High-capacity batteries, which may include a pack having multiple connected battery cells, may be used as, e.g., power supplies for hybrid vehicles.

Secondary batteries may be fabricated as various types, e.g., a cylindrical type, a prismatic type, or the like. The secondary battery may include an electrode assembly in which a separator is interposed between a positive electrode and a negative electrode. The electrode assembly may be inserted into a case with an electrolyte, and a cap assembly having an electrode terminal may be coupled with the case.

SUMMARY

Embodiments are directed to a secondary battery.

The embodiments may be realized by providing a secondary battery including an electrode assembly, the electrode assembly including a first electrode plate, a second electrode plate, and a separator between the first electrode plate and the second electrode plate; a first collecting plate electrically connected to the first electrode plate, the first collecting plate including a first fuse region; a second collecting plate electrically connected to the second electrode plate, the second collecting plate including a second fuse region; and a case accommodating the electrode assembly, the first collecting plate, and the second collecting plate, wherein a first sectional area of the first fuse region is larger than a second sectional area of the second fuse region.

The first sectional area may be about 2 to about 9 times larger than the second sectional area.

The first fuse region may include at least one first fuse hole, and the second fuse region may include at least one second fuse hole.

The first fuse hole may have a size smaller than a size of the second fuse hole.

A first distance between an outer edge of the first fuse hole and an outer edge of the first fuse region may be larger than a second distance between an outer edge of the second fuse hole and an outer edge of the second fuse region.

A number of first fuse holes may be smaller than a number of second fuse holes.

Each first fuse hole may have a same size as each second fuse hole.

The first collecting plate may further include a first fuse protrusion extending from at least one side part of the first fuse region adjacent to the first fuse hole.

The second collecting plate may further include a second fuse protrusion extending from at least one side part of the second fuse region adjacent to the second fuse hole.

The first fuse region having the first sectional area may include a first fuse lead having a first fuse lead sectional area smaller than another sectional area of other regions of the first collecting plate other, and the second fuse region having the second sectional area may include a second fuse lead having a second fuse lead sectional area smaller than another sectional area of other regions of the second collecting plate.

The first fuse lead and the second fuse lead may have a same width in one direction, and the first fuse lead may have a first thickness in another direction orthogonal to the one direction, the second fuse lead may have a second thickness in another direction orthogonal to the one direction, and the first thickness may be larger than the second thickness.

The first fuse lead and the second fuse lead may have a same thickness in one direction, and the first fuse lead may have a first width in another direction orthogonal to the one direction, the second fuse lead may have a second width in another direction orthogonal to the one direction, and the first width may be greater than the second width.

The first fuse lead may have a thickness larger than a thickness of the second fuse lead, and the first fuse lead may have a width larger than a width of the second fuse lead.

The secondary battery may further include a first electrode terminal electrically connected to the first electrode plate and the case.

The first collecting plate may include a first connecting part coupled with the first electrode terminal, and a first extending part extending from the first connecting part and coupled with the first electrode plate.

The first fuse region may be positioned at the first connecting part.

The secondary battery may further include a second electrode terminal electrically connected to the second electrode plate.

The second collecting plate may include a second connecting part coupled with the second electrode terminal, and a second extending part extending from the second connecting part and coupled with the second electrode plate.

The second fuse region may be positioned at the second connecting part.

The secondary battery may further include a cap assembly coupled with the case, the cap assembly including a cap plate coupled with an opening of the case, the cap plate including a short circuit hole; a first short circuit plate in the short circuit hole of the cap plate; and a second short circuit plate spaced apart from a top surface of the cap plate, facing the first short circuit plate, and being electrically connected to the second electrode plate.

BRIEF DESCRIPTION OF THE DRAWINGS

The embodiments will become apparent to those of ordinary skill in the art by describing in detail exemplary embodiments with reference to the attached drawings, in which.

DETAILED DESCRIPTION

Figure 1:
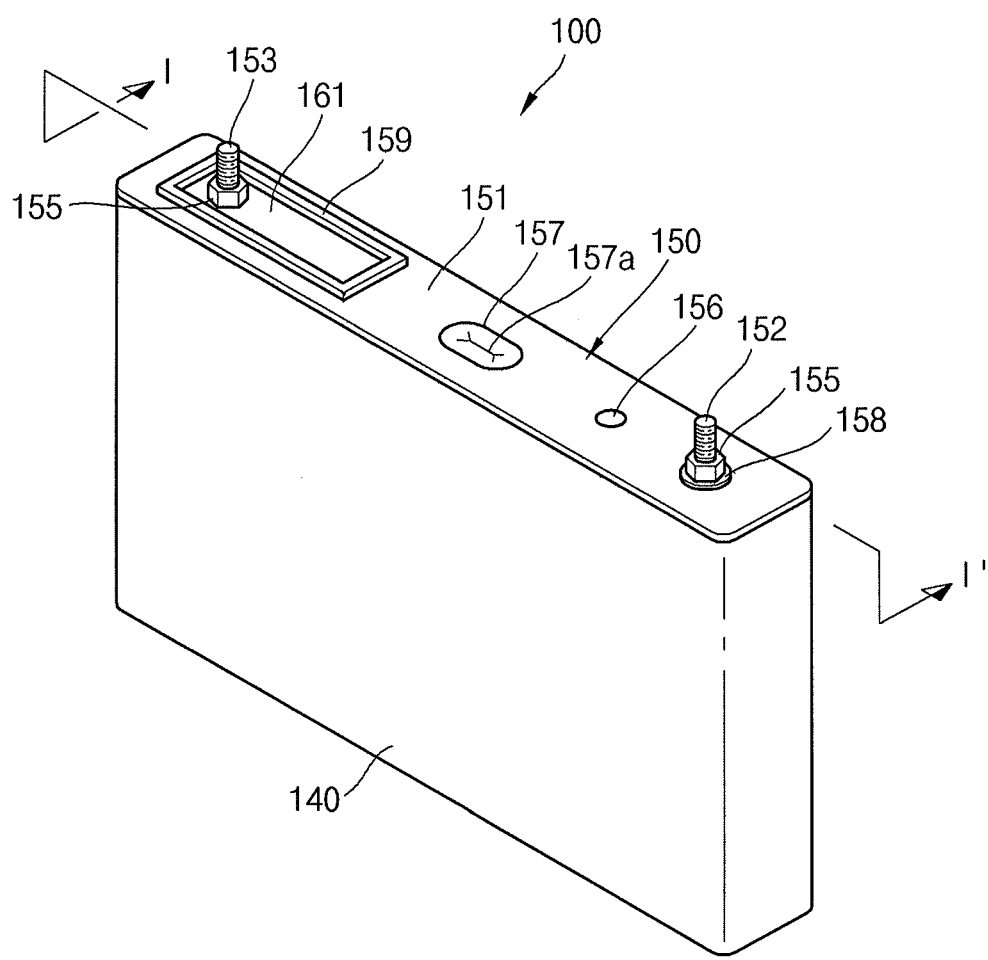
FIG. 1 illustrates a perspective view of a secondary battery according to an embodiment.

Korean Patent Application No. 10-2011-0064237, filed on Jun. 30, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
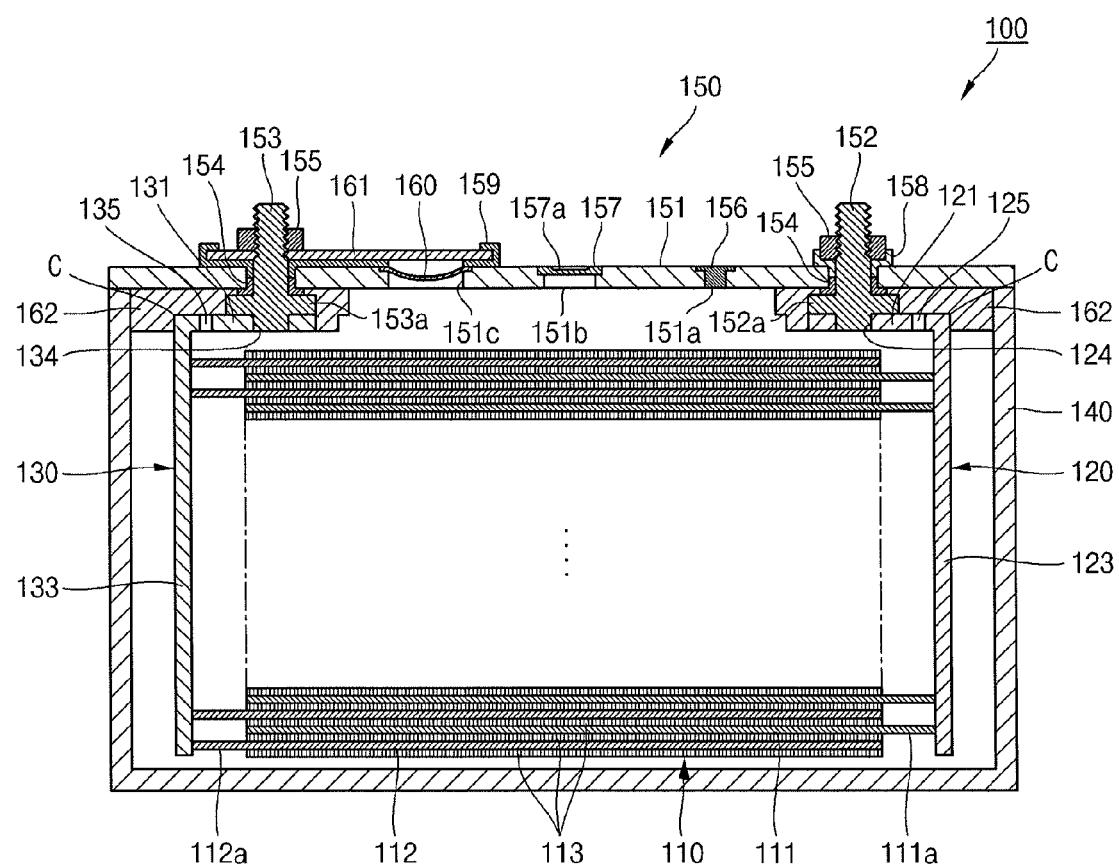
FIG. 2 illustrates a cross-sectional view, taken along the line I-I', of the secondary battery of FIG. 1.

FIG. 1 illustrates a perspective view of a secondary battery according to an embodiment. FIG. 2 illustrates a cross-sectional view of the secondary battery, taken along the line I-I' of FIG. 1.

Referring to FIGS. 1 and 2, the secondary battery 100 according to an embodiment may include an electrode assembly 110, a first collecting plate 120, a second collecting plate 130, a case 140, and a cap assembly 150.

The electrode assembly 110 may be formed by winding or stacking a first electrode plate 111, a separator 113, and a second electrode plate 112, which have a thin plate or film shape. In an implementation, the first electrode plate 111 may function as a positive electrode and the second electrode plate 112 may function as a negative electrode.

The first electrode plate 111 may be formed by applying a first electrode active material (e.g., a transition metal oxide) on a first electrode collector formed of metal foil (e.g., aluminum foil). The first electrode plate 111 may include a first electrode non-coating portion 111a on which the first electrode active metal is not applied. The first electrode non-coating portion 111a may function as a passage for current from the first electrode plate 111 to outside of the first electrode plate 111. The material of the first electrode plate 111 is not limited to the transition metal oxide and a metal foil, and other materials having the same or similar functions may be used.

The second electrode plate 112 may be formed by applying a second electrode active material (e.g., graphite or carbon) on a second electrode collector formed of metal foil (e.g., nickel or copper foil). The second electrode plate 112 may include a second electrode non-coating portion 112a on which the second electrode active metal is not applied. The second electrode non-coating portion 112a may function as a passage for current from the second electrode plate 112 to outside of the second electrode plate 112. The material of the second electrode 112 is not limited to the graphite or carbon and a metal foil, and other materials having the same or similar functions may be used.

In an implementation, the first and second electrode plates 111 and 112 may reverse polarities with each other.

The separator 113 may be disposed between the first electrode plate 111 and the second electrode plate 112 to reduce the possibility of and/or prevent a short circuit and to facilitate movement of lithium ions. The separator 113 may be formed of, e.g., a polymer such as polyethylene or a composite film of polypropylene and polyethylene. However, the material of the separator 113 is not limited to polyethylene or a composite film.

A first collecting plate 120 and a second collecting plate 130 (that are electrically connected to the first and second electrode plates 111 and 112, respectively) may be coupled with ends of the electrode assembly 110.

The first collecting plate 120 may be formed of a conductive material, e.g., aluminum or aluminum alloy. The first collecting plate 120 may contact, e.g., may be directly coupled or connected to, the first electrode non-coating portion 111a protruding from an end of the electrode assembly 110 to then be electrically connected to the first electrode plate 111. The first collecting plate 120 may include a first connecting part 121, a first extending part 123, a first terminal hole 124, and a first fuse hole 125. An overall configuration of the first collecting plate 120 will be described below in detail.

The second collecting plate 130 may be formed of a conductive material, e.g., copper, a copper alloy, nickel, or a nickel alloy. The second collecting plate 130 may contact, e.g., may be directly coupled or connected to, the second electrode non-coating portion 112a protruding from the other end of the electrode assembly 110. The second collecting plate 130 may include a second connecting part 131, a second extending part 133, a second terminal hole 134, and a second fuse hole 135. An overall configuration of the second collecting plate 130 will be described below in detail.

The case 140 may be formed of a conductive metal, e.g., aluminum, aluminum alloy, or steel plated with nickel, and may have an approximately hexahedron shape having an opening through which the electrode assembly 110, the first collecting plate 120, and the second collecting plate 130 may be placed. While FIG. 2 shows that the case 140 and the cap assembly 150 are assembled with each other and an opening is not provided in the case 140, the opening may correspond to a substantially open portion at a periphery of the cap assembly 150.

An inner surface of the case 140 may be treated so that the case 140 is electrically insulated from the electrode assembly 110, the first and second collecting plates 120 and 130, and the cap assembly 150. The case 140 may have a polarity, e.g., a positive polarity.

The cap assembly 150 may be coupled with the case 140. The cap assembly 150 may include the cap plate 151, a first electrode terminal 152, a second electrode terminal 153, a gasket 154, and nuts 155. The cap assembly 150 may further include a plug 156, a vent plate 157, a connection plate 158, an upper insulation member 159, a first short circuit plate 160, a second short circuit plate 161, and a lower insulation member 162.

The cap plate 151 may close or may be coupled with the opening of the case 140, and may be formed of the same material as that of the case 140. In an implementation, the cap plate 151 and the case 140 may have the same polarity.

The first electrode terminal 152 may pass through one side of the cap plate 151 and may be electrically connected to the first collecting plate 120. The first electrode terminal 152 may have a column shape. A thread may be formed on an outer surface of an upper column part exposed on an upper portion of the cap plate 151, and a flange 152a may be formed at a lower column part at a lower side of the cap plate 151 to help prevent removal of the first electrode terminal 152 from the cap plate 151. In the first electrode terminal 152, a column part positioned at a lower side of the flange 152a may be fitted into the first terminal hole 124 of the first collecting plate 120. The first electrode terminal 152 may be electrically connected to the cap plate 151.

The second electrode terminal 153 may pass through another side of the cap plate 151 and may be electrically connected to the second collecting plate 130. The second electrode terminal 153 may have the same shape and structure as that of the first electrode terminal 152, and thus, repeated descriptions thereof are omitted. However, the second electrode terminal 153 may be insulated from the cap plate 151.

The gasket 154 may be formed of an electrically insulating material and may be disposed between each of the first and second terminals 152 and 153 and the cap plate 151 to seal spaces between each of the first and second terminals 152 and 153 and the cap plate 151. The gasket 154 may reduce or prevent ingress of external moisture into the secondary battery 100 and/or leakage of the electrolyte from the secondary battery 100.

The nuts 155 may be engaged with the threads on the first electrode terminal 152 and the second electrode terminal 153 and respectively may fix the first electrode terminal 152 and the second electrode terminal 153 to the cap plate 151.

The plug 156 may close an electrolyte injection hole 151a of the cap plate 151. The vent plate 157 may be disposed on a vent hole 151b of the cap plate 151 and a notch 157a may be formed in the vent plate 157 so that the vent plate 157 may be opened in response to a preset pressure.

The connecting plate 158 may be disposed between the first electrode terminal 152 and the cap plate 151 to facilitate fitting of the first electrode terminal 152 into a space between the first electrode terminal 152 and the cap plate 151, and may be in tight contact with the cap plate 151 and the gasket 154 via, e.g., pressure from the nuts 155. The connecting plate 158 may electrically connect the first electrode terminal 152 and the cap plate 151.

The upper insulation member 159 may be disposed between the second electrode terminal 153 and the cap plate 151 and may insulate the first and second terminal plates 123 and 133 from the cap plate 151 to facilitate fitting of the second electrode terminal 153 into the space therebetween and may be in tight contact with the cap plate 151 and the gasket 154. The upper insulation member 159 may insulate the second terminal plate 153 from the cap plate 151.

The first short circuit plate 160 may be disposed between the upper insulation member 159 and the cap plate 151 at a short circuit hole 151c of the cap plate 151. The first short circuit plate 160 may be an insertion plate having a downwardly convex round part and an edge part fixed to the cap plate 151. When an internal pressure of the secondary battery 100 exceeds a preset pressure (e.g., due to over-charge), the first short circuit plate 160 may be inverted to convexly protrude upwardly. In an implementation, the first short circuit plate 160 may have the same polarity as that of the cap plate 151.

The second short circuit plate 161 may be disposed on an exterior of and spaced apart from the cap plate 151, e.g., on the upper insulation member 159, and the second electrode terminal 153 may pass through the second short circuit plate 161. The second short circuit plate 161 may be electrically connected to the second electrode terminal 153. The second short circuit plate 161 may contact the first short circuit plate 160 convexly protruding upwardly when the internal pressure of the secondary battery 100 exceeds a preset pressure (e.g., due to over-charge), thereby inducing a short circuit. If the short circuit is induced, a large amount of current (CP1 of FIG. 3E) may flow and heat may be generated. Here, a second fuse region (Sf2 of FIG. 3C) may function as a fuse, thereby improving safety of the secondary battery 100.

The lower insulation member 162 may be disposed between each of the first collecting plate 120 and the second collecting plate 130 and the cap plate 151 and may reduce or prevent an undesirable short circuit therebetween.

Hereinafter, configurations of the first collecting plate 120 and the second collecting plate 130 will be described in detail.

Figure 3A:
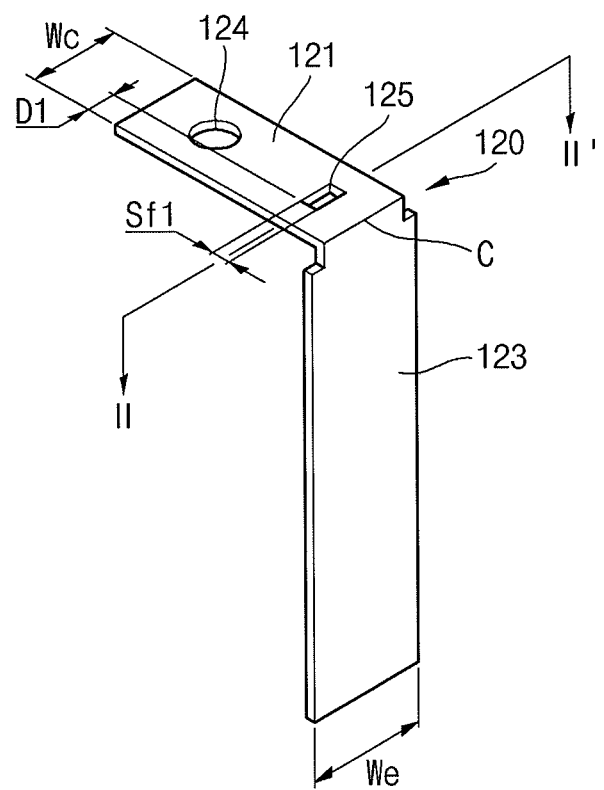
FIG. 3A illustrates a perspective view of a first collecting plate of the secondary battery of FIG. 2.
Figure 3B:
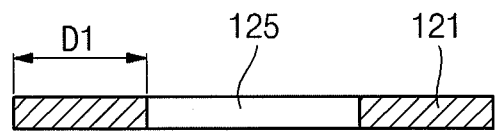
FIG. 3B illustrates a cross-sectional view of a first fuse region, taken along the line II-II' of FIG. 3A.
Figure 3C:
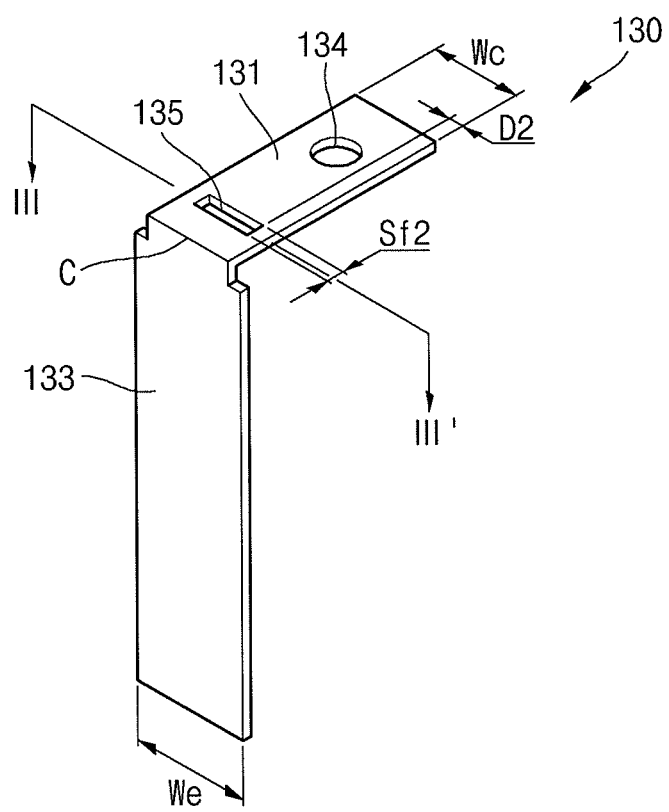
FIG. 3C illustrates a perspective view of a second collecting plate of the secondary battery of FIG. 2.

FIG. 3A illustrates a perspective view of a first collecting plate shown in FIG. 2. FIG. 3B illustrates a cross-sectional view of a first fuse region, taken along the line II-II' of FIG. 3A. FIG. 3C illustrates a perspective view of a second collecting plate shown in FIG. 2. FIG. 3B illustrates a cross-sectional view of a second fuse region, taken along the line III-III' of FIG. 3C. FIG. 3E illustrates a plan view showing a flow of current in the second fuse region shown in FIG. 3D.

Referring to FIGS. 3A and 3B, the first connecting part 121 of the first collecting plate 120 may be disposed between an upper side of the electrode assembly 110 and a lower side of the cap assembly 150 and may have a plate shape. The first connecting part 121 may have a connection width Wc. The first connecting part 121 may include a first fuse region Sf1 formed at one side thereof.

The first extending part 123 may be bent and may extend at an end of the first connecting part 121 and may have a plate shape substantially contacting the first electrode non-coating portion 111a. The first extending part 123 may have an extension width We larger than the connection width Wc. Thus, migration of an internal gas of the secondary battery 100 toward the opened vent plate 157 may be facilitated when the internal pressure of the secondary battery 100 exceeds a preset pressure. A corner where the first connecting part 121 and the first extending part 123 meet is denoted by reference symbol 'C' and the first connecting part 121 and the first extending part 123 may be perpendicular to each other with respect to the corner C. While it has been described that the first fuse region Sf1 is formed in the first connecting part 121, in an implementation, the first fuse region Sf1 may be formed in a region of the first extending part 123 that is not in contact with an electrolyte, e.g., a region close or adjacent to the corner C.

The first terminal hole 124 may be formed at another side of the first connecting part 121 (e.g., a region not overlapping the first fuse region Sf1) and may provide a space into which the first electrode terminal 152 of the cap assembly 150 may be fitted and coupled.

The first fuse hole 125 may be formed in the first fuse region Sf1 of the first connecting part 121. The first fuse hole 125 be formed such that the first fuse region Sf1 of the first connecting part 121 has a smaller sectional area than sectional area of other regions of the first collecting plate 120 (excluding a region where the first terminal hole 124 is formed). The first fuse hole 125 may have a rectangular shape elongated in a widthwise direction of the first connecting part 121. However, the shape of the first fuse hole 125 is not limited thereto. D1 may be a first distance between a first terminal part of the first fuse hole 125 and a first side part of the first fuse region Sf1. For example, an inner edge of the first fuse hole 125 may be spaced a distance D1 apart from an outer edge of the first connecting part 121 of the first collecting plate 120. The first fuse region Sf1 having the first fuse hole 125 formed thereat may be melted by heat generated when a short circuit occurs at the electrode assembly 110 and a large amount of current flows in the first collecting plate 120, thereby functioning as a fuse that is tripped and interrupts the flow of current between the case 140 and the cap plate 151 and the electrode assembly 110. The short circuit of the electrode assembly 110 may occur when an external conductive material penetrates and/or passes through the secondary battery 100 through the case 140 or the cap plate 151 (functioning as a positive electrode). As described above, the first fuse region Sf1 (having the first fuse hole 125 formed thereat) may improve the safety of the secondary battery 100 when the external conductive material penetrates and/or passes through the secondary battery 100.

Figure 3D:
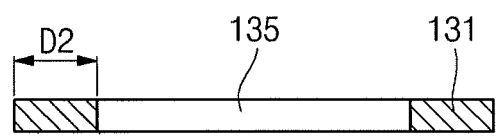
FIG. 3D illustrates a cross-sectional view of a second fuse region, taken along the line III-III' of FIG. 3C.
Figure 3E:
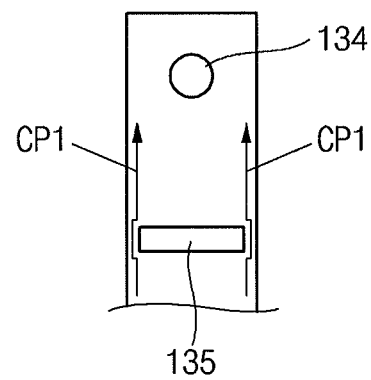
FIG. 3E illustrates a plan view showing a flow of current in the second fuse region shown in FIG. 3D.

Referring to FIGS. 3C to 3E, the second connecting part 131 of the second collecting plate 130 may be disposed between the upper side of the electrode assembly 110 and the lower side of the cap assembly 150 and may have a plate shape. The second connecting part 131 may have a connection width Wc. The second connecting part 131 may include the second fuse region Sf2 formed at one side thereof.

The second extending part 133 may be bent and may extend at an end of the second connecting part 131 and may have a plate shape substantially contacting the second electrode non-coating portion 112a. The second extending part 133 may have an extension width We larger than the connection width Wc. A corner where the second connecting part 131 and the second extending part 133 meet is also denoted by reference symbol 'C' and the second connecting part 131 and the second extending part 133 may be disposed to be perpendicular to each other with respect to the corner C. While it has been described that the second fuse region Sf2 is formed in the second connecting part 131, in an implementation, the second fuse region Sf2 may be formed in a region of the second extending part 133 that is not in contact with an electrolyte, e.g., a region close to the corner C.

The second terminal hole 134 may be formed at another side of the second connecting part 131 (e.g., a region not overlapping the second fuse region Sf2) and may provide a space into which the second electrode terminal 153 of the cap assembly 150 may be fitted and coupled.

The second fuse hole 135 may be formed in the second fuse region Sf2 of the second connecting part 131. The second fuse hole 135 may be formed such that the second fuse region Sf2 of the second collecting plate 130 has a smaller sectional area than sectional area of other regions of the second collecting plate 130 (excluding a region where the second terminal hole 134 is formed). The second fuse hole 135 may have a rectangular shape elongated in a widthwise direction of the second connecting part 131. However, the shape of the second fuse hole 135 is not limited thereto. D2 may be a second distance between a first terminal part of the second fuse hole 135 and a first side part of the second fuse region Sf2. For example, an inner edge of the second fuse hole 135 may be spaced a distance D2 apart from an outer edge of the second connecting part 131 of the second collecting plate 130. The second fuse region Sf2 (having the second fuse hole 135 formed thereat) may be melted, e.g., may trip, earlier than the first fuse region Sf1 by heat generated when a short circuit (e.g., due to over-charge) or an external short circuit (e.g., due to an external conductive material) occurs at the electrode assembly 110 and a large amount of current CP1 may flow in the second collecting plate 130 (functioning as a fuse). Thus, the flow of current between the case 140 or the cap plate 151 and the second electrode terminal 153 may be interrupted.

The short circuit due to over-charge may be induced by bringing the first short circuit plate 160 and the second short circuit plate 161 into contact with each other when the internal pressure of the secondary battery 100 exceeds a preset pressure due to heat generated by the over-charge of the secondary battery 100 or decomposition of an electrolyte. The second fuse region Sf2 may be melted to then interrupt the flow of current, thereby preventing the secondary battery 100 from further charging or discharging before a danger, e.g., fire or explosion, occurs to the secondary battery 100.

The external short due to an external conductive material may be caused by the external conductive material electrically connecting the case 140, the cap plate 151, or the first electrode terminal 152 (functioning as a positive electrode) and the second electrode terminal 153 (functioning as a negative electrode). In this case, the second fuse region Sf2 may be melted to interrupt the flow of current, thereby preventing the secondary battery 100 from further charging or discharging before a danger, e.g., fire or explosion, occurs to the secondary battery 100.

Meanwhile, the second fuse region Sf2 may function as a fuse, e.g., may melt or trip, earlier than the first fuse region Sf1 such that the first fuse region Sf1 may function as a fuse when an external conductive material penetrates into the secondary battery 100 through the case 140 or the cap plate 151 functioning as a positive electrode.

In order to help ensure that the second fuse region Sf2 melts or trips earlier than the first fuse region Sf1, a first sectional area of the first fuse region Sf1 may be larger than a second sectional area of the second fuse region Sf2. For example, a large amount of heat may be generated when the current CP1 flows in the second fuse region Sf2 (with a second sectional area smaller than the first sectional area) by making resistance of the second fuse region Sf2 larger than that of the first fuse region Sf1. For example, the first fuse hole 125 may be smaller than the second fuse hole 135, e.g., the first distance D1 may be larger than the second distance D2. In an implementation, the first sectional area of the first fuse region Sf1 may be about 2 to about 9 times the second sectional area of the second fuse region Sf2. Maintaining the first sectional area of the first fuse region Sf1 at about 2 times the second sectional area of the second fuse region Sf2 or greater may help ensure that the second fuse region Sf2 has a lower melting point than the first fuse region Sf1 and is tripped or melted earlier than the first fuse region Sf1. Maintaining the first sectional area of the first fuse region Sf1 at about 9 times the second sectional area of the second fuse region Sf2 or less may help prevent a reduction in strength of the second fuse region Sf2.

As described above, the secondary battery 100 according to the present embodiment may include the first collecting plate 120 (having the first fuse region Sf1 with a first sectional area through the first fuse hole 125) and the second collecting plate 130 (having the second fuse region Sf2 with a second sectional area through the second fuse hole 135), the second sectional area being smaller than the first sectional area. Accordingly, when a short circuit due to over-charge, an external short circuit due to an external conductive material, or a short circuit due to penetration of an external conductive material occurs in the secondary battery 100, the flow of current may be interrupted, thereby improving the safety of the secondary battery 100.

A secondary battery according to another embodiment will now be described.

Figure 4A:
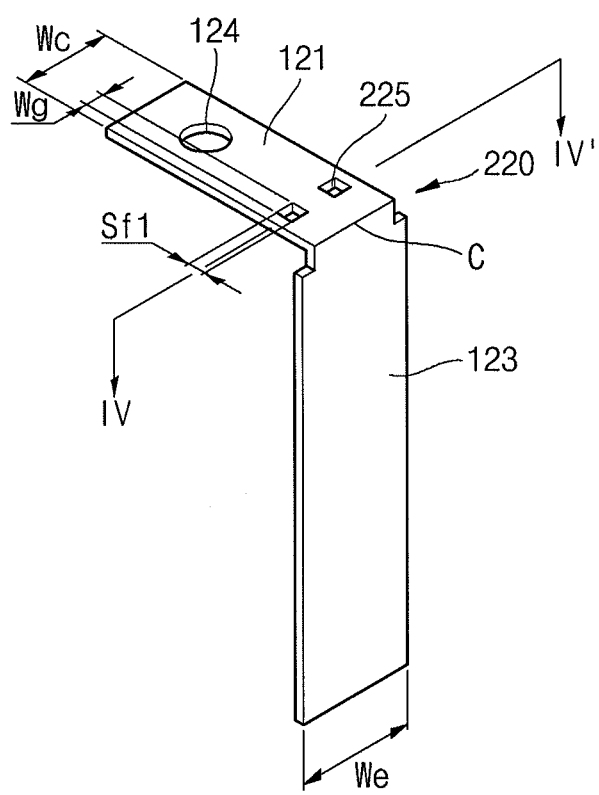
FIG. 4A illustrates a perspective view of a first collecting plate of a secondary battery according to another embodiment.
Figure 4B:
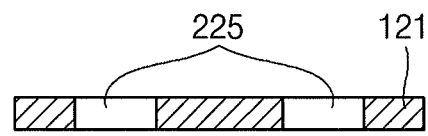
FIG. 4B illustrates a cross-sectional view of a first fuse region, taken along the line IV-IV' of FIG. 4A.
Figure 4C:
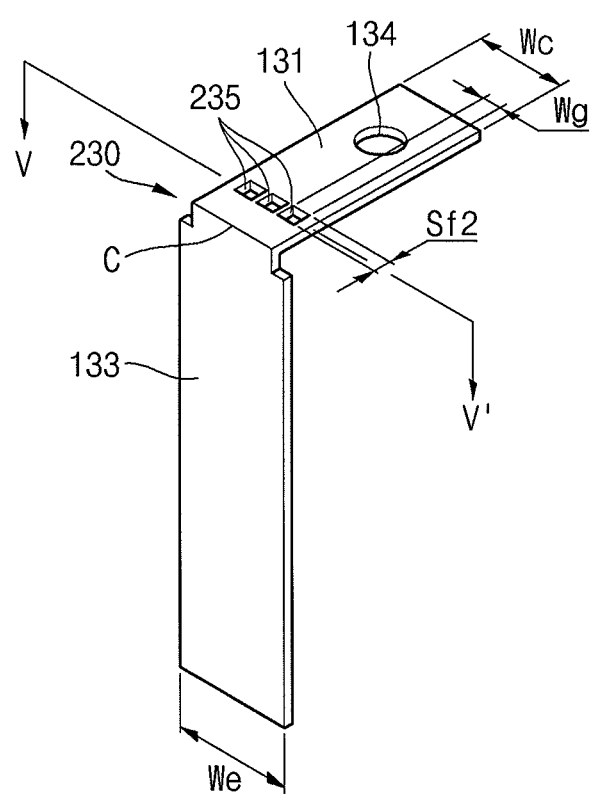
FIG. 4C illustrates a perspective view of a second collecting plate of the secondary battery according to another embodiment.
Figure 4D:
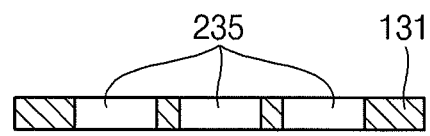
FIG. 4D illustrates a cross-sectional view of a second fuse region, taken along the line V-V' of FIG. 4C.
Figure 4E:
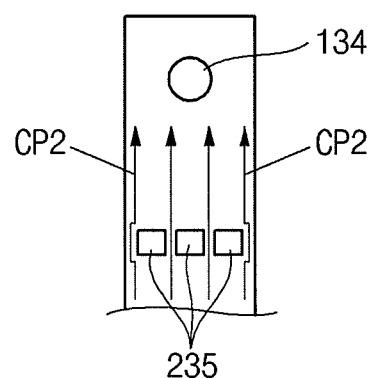
FIG. 4E illustrates a plan view showing a flow of current in the second fuse region shown in FIG. 4D.

FIG. 4A illustrates a perspective view of a first collecting plate of a secondary battery according to another embodiment. FIG. 4B illustrates a cross-sectional view of a first fuse region, taken along the line IV-IV' of FIG. 4A. FIG. 4C illustrates a perspective view of a second collecting plate of the secondary battery according to another embodiment. FIG. 4D illustrates a cross-sectional view of a second fuse region, taken along the line V-V' of FIG. 4C. FIG. 4E illustrates a plan view showing a flow of current in the second fuse region shown in FIG. 4D.

The secondary battery according to the present embodiment is substantially the same as the secondary battery 100 according to the previous embodiment shown in FIGS. 1 to 3E, except for configurations of first fuse holes 225 of a first collecting plate 220 and second fuse holes 235 of a second collecting plate 230. Accordingly, repeated descriptions of the same components as those of the secondary battery 100 according to the previous embodiment will be omitted, and the following description will focus on the first fuse holes 225 of the first collecting plate 220 and the second fuse holes 235 of the second collecting plate 230.

Referring to FIGS. 4A to 4E, the first collecting plate 220 may include a first connecting part 121, a first extending part 123, a first terminal hole 124, and first fuse holes 225. The second collecting plate 230 may include a second connecting part 131, a second extending part 133, a second terminal hole 134, and second fuse holes 235.

Referring to FIGS. 4A and 4B, the first fuse holes 225 are similar to the first fuse hole 125 of the previous embodiment. However, the first fuse holes 225 may include a plurality of first fuse holes formed in a first fuse region Sf1. For example, two first fuse holes 225 may be formed in the first fuse region Sf1.

Referring to FIGS. 4C to 4E, the second fuse holes 235 are similar to the second fuse hole 135 of the previous embodiment. However, the second fuse holes 235 may include a plurality of second fuse holes formed in a second fuse region Sf2. For example, three second fuse holes 235 may be formed in the second fuse region Sf2. In an implementation, a number of the first fuse holes 225 may be smaller than the number of the second fuse holes 235. Accordingly, a first sectional area of the first fuse region Sf1 may be larger than a second sectional area of the second fuse region Sf2. The first fuse holes 225 and the second fuse holes 235 may have the same size. For example, a width Wg of each of the first fuse holes 225 may be equal to a width Wg of each of the second fuse holes 235. The second fuse region Sf2 having the second fuse holes 235 may be melted or tripped earlier than the first fuse region Sf1 by the heat generated when a short circuit due to over-charge or an external short circuit due to an external conductive material occurs and a large current CP2 may flow to the second collecting plate 230, thereby functioning as a fuse that interrupts the flow of current between a case 140 or a cap plate 151 and a second electrode terminal 153.

As described above, the secondary battery according to the present embodiment of may include the first collecting plate 220 (having the first fuse region Sf1 with a first sectional area through the plurality of first fuse holes 225), and the second collecting plate 230 (having the second fuse region Sf2 with a second sectional area through the plurality of second fuse holes 235). The second sectional area may be smaller than the first sectional area. Accordingly, when a short circuit due to over-charge, an external short circuit due to an external conductive material, or a short circuit due to penetration of an external conductive material, occurs to the secondary battery, the flow of current may be interrupted, thereby improving the safety of the secondary battery.

Figure 5A:
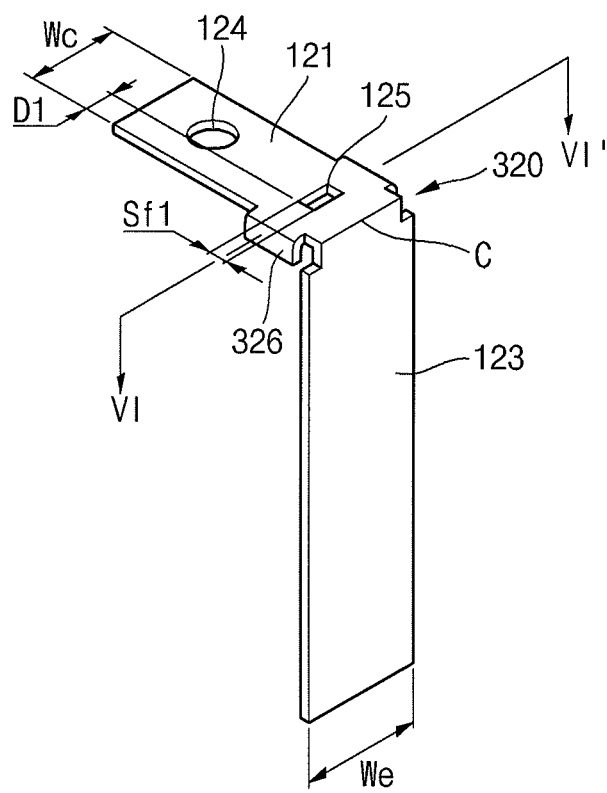
FIG. 5A illustrates a perspective view of a first collecting plate of a secondary battery according to yet another embodiment.
Figure 5B:
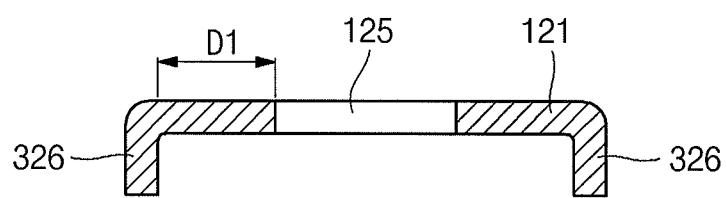
FIG. 5B illustrates a cross-sectional view of a first fuse region, taken along the line VI-VI' of FIG. 5A.
Figure 5C:
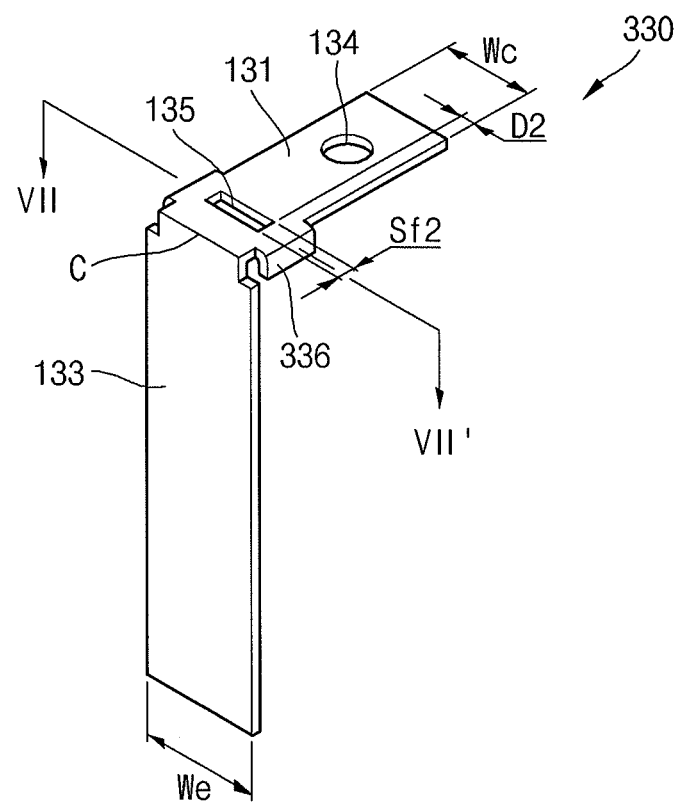
FIG. 5C illustrates a perspective view of a second collecting plate of the secondary battery according to yet another embodiment.
Figure 5D:
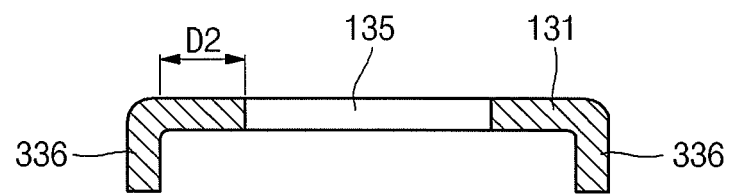
FIG. 5D illustrates a cross-sectional view of a second fuse region, taken along the line VII-VII' of FIG. 5C.
Figure 5E:
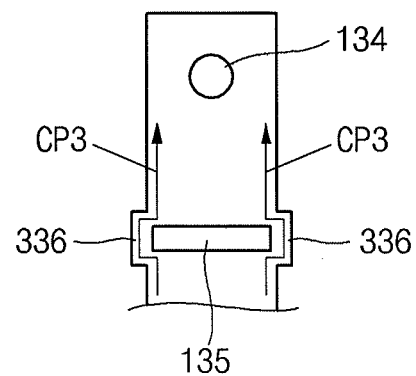
FIG. 5E illustrates a plan view showing a flow of current in the second fuse region shown in FIG. 5D.

FIG. 5A illustrates a perspective view of a first collecting plate of a secondary battery according to yet another embodiment. FIG. 5B illustrates a cross-sectional view of a first fuse region, taken along the line VI-VI' of FIG. 5A. FIG. 5C illustrates a perspective view of a second collecting plate of the secondary battery according to yet another embodiment. FIG. 5D illustrates a cross-sectional view of a second fuse region, taken along the line VII-VII' of FIG. 5C. FIG. 5E illustrates a plan view showing a flow of current in the second fuse region shown in FIG. 5D.

The secondary battery according to the present embodiment is substantially the same as the secondary battery 100 according to the previous embodiment shown in FIGS. 1 to 3E, except for configurations of first fuse protrusions 326 of a first collecting plate 320 and second fuse protrusions 336 of a second collecting plate 330. Accordingly, repeated descriptions of the same components as those of the secondary battery 100 according to the previous embodiment will be omitted, and the following description will focus on the first fuse protrusions 326 of the first collecting plate 320 and the second fuse protrusions 336 of the second collecting plate 330.

Referring to FIGS. 5A to 5E, the first collecting plate 320 may include a first connecting part 121, a first extending part 123, a first terminal hole 124, a first fuse hole 125, and first fuse protrusions 326. The second collecting plate 330 may include a second connecting part 131, a second extending part 133, a second terminal hole 134, a second fuse hole 135, and second fuse protrusions 336.

Referring to FIGS. 5A and 5B, the first fuse protrusions 326 may be bent at sides of the first fuse region Sf1 and may extend toward the electrode assembly 110. The first fuse protrusions 326 may be formed at a first side part and a second side part of the first fuse hole 125, e.g., at respective sides of the first fuse hole 125. For example, the first fuse protrusions 326 may be bent around the first fuse hole 125 and may reinforce the first fuse region Sf1. Accordingly, the first fuse protrusions 326 may prevent the first fuse region Sf1 from being bent or damaged due to the external shocks prior to occurrence of a short circuit due to an external conductive material at the electrode assembly 110. In addition, the first fuse protrusions 326 may allow the current flowing between the first connecting part 121 and the first extending part 123 to make a detour toward or through the first fuse protrusions 326, thereby extending a time in which the current flows in a narrow region. Accordingly, the first fuse protrusions 326 may make a larger amount of heat generated by a short circuit of the electrode assembly 110 when an external conductive material penetrates into the secondary battery 100, thereby increasing reliability of the first fuse region Sf1 functioning as a fuse.

Referring to FIGS. 5C to 5E, the second fuse protrusions 336 may be bent at sides of the second fuse region Sf2 and may extend toward the electrode assembly 110. The second fuse protrusions 336 may include at least one second fuse protrusion formed at a first side part and a second side part of the second fuse hole 135, e.g., at respective sides of the second fuse hole 135. For example, the second fuse protrusions 336 may reinforce the second fuse region Sf2. In addition, the second fuse protrusions 336 may allow the current CP3 flowing between the second connecting part 131 and the second extending part 133 to make a detour toward or through the second fuse protrusions 336, thereby extending a time in which the current flows in a narrow region. Accordingly, the second fuse protrusions 336 may make a larger amount of heat generated by a short circuit due to over-charge or a short circuit due to an external conductive material, thereby increasing reliability of the second fuse region Sf2 functioning as a fuse.

As described above, the secondary battery according to the present embodiment may include the first collecting plate 320 (having the first fuse region Sf1 with a first sectional area through the first fuse hole 125) and the second collecting plate 330 (having the second fuse region Sf2 with a second sectional area through the second fuse hole 135). The second sectional area may be smaller than the first sectional area. Therefore, when a short circuit due to over-charge, an external short circuit due to an external conductive material, or a short circuit due to penetration of an external conductive material occurs to the secondary battery, the flow of current may be interrupted, thereby improving the safety of the secondary battery.

In addition, the secondary battery according to the present embodiment may include the first fuse protrusions 326 on the first collecting plate 320 and the second fuse protrusions 336 on the second collecting plate 330. Therefore, before a short circuit occurs, the first fuse protrusions 326 and the second fuse protrusions 336 may prevent the first fuse region Sf1 and the second fuse region Sf2 from being bent or damaged due to external shocks, thereby preventing the first fuse region Sf1 and the second fuse region Sf2 from losing their functionality as fuses. Once a short circuit occurs, the safety of the secondary battery may be improved by increasing the reliability of the first fuse region Sf1 and the second fuse region Sf2 functioning as fuses.

A secondary battery according to still another embodiment will now be described.

Figure 6A:
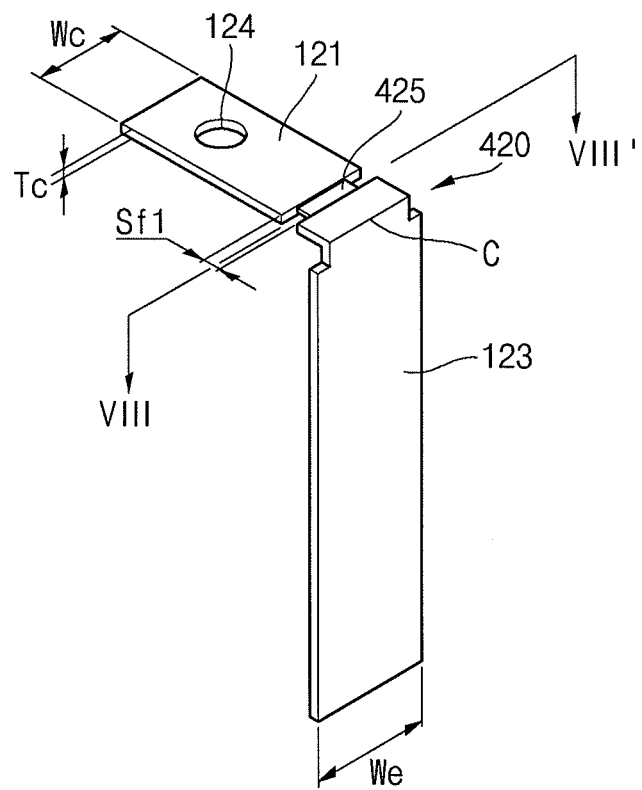
FIG. 6A illustrates a perspective view of a first collecting plate of a secondary battery according to still another embodiment.
Figure 6B:
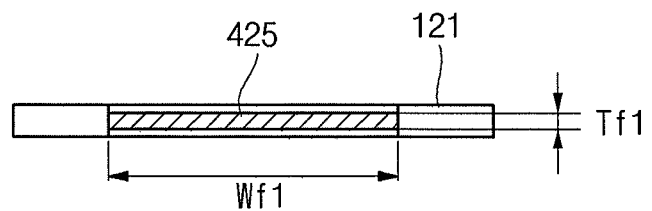
FIG. 6B illustrates a cross-sectional view of a first fuse region, taken along the line VIII-VIII' of FIG. 6A.
Figure 6C:
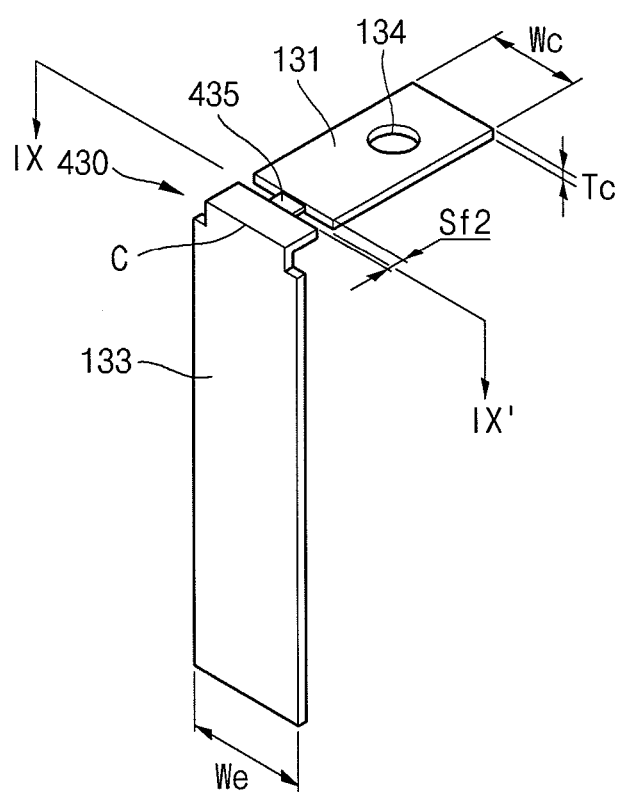
FIG. 6C illustrates a perspective view of a second collecting plate of the secondary battery according to still another embodiment.
Figure 6D:
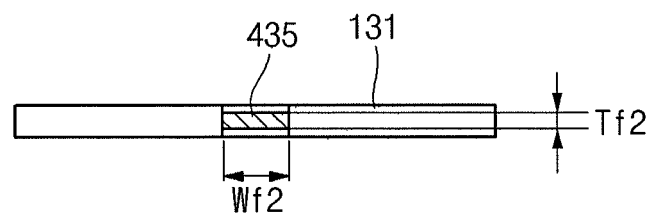
FIG. 6D illustrates a cross-sectional view of a second fuse region, taken along the line IX-IX' of FIG. 6C.
Figure 6E:
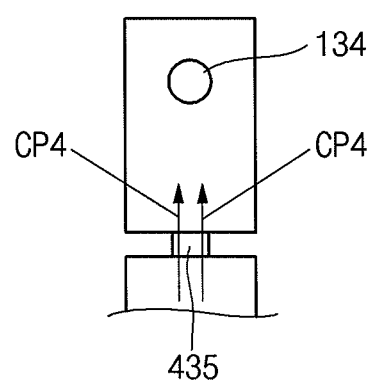
FIG. 6E illustrates a plan view showing a flow of current in the second fuse region shown in FIG. 6D.

FIG. 6A illustrates a perspective view of a first collecting plate of a secondary battery according to still another embodiment. FIG. 6B illustrates a cross-sectional view of a first fuse region, taken along the line VIII-VIII' of FIG. 6A. FIG. 6C illustrates a perspective view of a second collecting plate of the secondary battery according to still another embodiment. FIG. 6D illustrates a cross-sectional view of a second fuse region, taken along the line IX-IX' of FIG. 6C. FIG. 6E illustrates a plan view showing a flow of current in the second fuse region shown in FIG. 6D.

The secondary battery according to the present embodiment is substantially the same as the secondary battery 100 according to the previous embodiment shown in FIGS. 1 to 3E, except for configurations of a first fuse lead 425 of a first collecting plate 420 and a second fuse lead 435 of a second collecting plate 430. Accordingly, repeated descriptions of the same components as those of the secondary battery 100 according to the previous embodiment will be omitted, and the following description will focus on the first fuse lead 425 of the first collecting plate 420 and the second fuse lead 435 of the second collecting plate 430.

Referring to FIGS. 6A to 6E, the first collecting plate 420 may include a first connecting part 121, a first extending part 123, a first terminal hole 124, and the first fuse lead 425. The second collecting plate 330 may include a second connecting part 131, a second extending part 133, a second terminal hole 134, and the second fuse lead 435.

Referring to FIGS. 6A and 6B, the first fuse lead 425 may be formed at a first fuse region Sf1 of the first connecting part 121. The first fuse region Sf1 may have a smaller sectional area than sectional area of other regions of the first collecting plate 420 (excluding a region where the first terminal hole 124 is formed). For example, the first fuse lead 425 may have a width smaller than a width, e.g., a connection width Wc, of the first collecting plate 420, and a thickness smaller than a thickness, e.g., a connection thickness Tc, of the first collecting plate 420. For example, as shown in FIGS. 6A and 6B, the first fuse lead 425 may have a width Wf1 smaller than the width, e.g., the connection width Wc, of the first collecting plate 420 and a thickness Tf1 smaller than the thickness, e.g., the connection thickness Tc, of the first collecting plate 420. The first fuse region Sf1 having the first fuse lead 425 formed thereat may be melted by the heat generated when an external conductive material penetrates into the secondary battery through a case 140 or a cap plate 151 to cause a short circuit at the electrode assembly 110, and a large amount of current may flow in the first collecting plate 420, thereby functioning as a fuse that trips and interrupts the flow of current between the case 140 and the cap plate 151 and the electrode assembly 110.

Referring to FIGS. 6C to 6E, the second fuse lead 435 may be formed at a second fuse region Sf2 of the second connecting part 131. The second fuse lead 435 may have a smaller sectional area sectional area of than other regions of the second collecting plate 430 (excluding a region where the second terminal hole 434 is formed). In an implementation, the second fuse lead 435 may have a width smaller than that of the second collecting plate 430, e.g., a connection width Wc, and a thickness smaller than that of the second collecting plate 430, e.g., a connection thickness Tc. For example, as shown in FIGS. 6C and 6D, the second fuse lead 435 may have a width Wf2 smaller than the width of the second collecting plate 430, e.g., the connection width Wc, and a thickness Tf2 smaller than that of the second collecting plate 430, e.g., the connection thickness Tc.

In an implementation, the first fuse region Sf1 may have a first sectional area larger than a second sectional area of the second fuse region Sf2. Thus, in a state in which the first fuse lead 425 and the second fuse lead 435 have the same width, the first fuse lead 425 may have a larger thickness than the second fuse lead 435. As shown in FIGS. 6A to 6D, in a state in which the thickness Tf1 of the first fuse lead 425 is equal to the thickness Tf2 of the second fuse lead 435, the width Wf1 of the first fuse lead 425 may be larger than the width Wf2 of the second fuse lead 435. Alternatively, the width and thickness of the first fuse lead 425 may be equal to those of the second fuse lead 435.

The second fuse region Sf2 (having the second fuse lead 435 formed thereat) may be melted earlier than the first fuse region Sf1 by the heat generated when a short circuit due to over-charge or an external short circuit due to an external conductive material occurs to the electrode assembly 110 and a large amount of current CP4 flows in the second collecting plate 430, thereby functioning as a fuse that trips and interrupts the flow of current between the case 140 or the cap plate 151 and the second electrode terminal 153.

As described above, the secondary battery according to the present embodiment may include the first collecting plate 420 (having the first fuse region Sf1 with a first sectional area through the first fuse lead 425) and the second collecting plate 430 (having the second fuse region Sf2 with a second sectional area through the second fuse lead 435), the second sectional area Sf2 being smaller than the first sectional area. Therefore, when a short circuit due to over-charge, an external short circuit due to an external conductive material, or a short circuit due to penetration of an external conductive material, occurs to the secondary battery, the flow of current may be interrupted, thereby improving the safety of the secondary battery and achieving an advance in the art.

By way of summation and review, when excess heat is generated or the electrolyte is decomposed, an internal temperature of a battery may rise, thereby increasing the possibility of explosion and/or fire.

The embodiments provide a secondary battery including a first collecting plate having a first fuse region with a first sectional area and a second collecting plate having a second fuse region with a second sectional area to interrupt the flow of current in an event of, e.g., a short circuit due to overcharge, an external short circuit due to an external conductive material, a short circuit due to penetration of an external conductive material, or the like, thereby improving the safety of the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly, the electrode assembly including a first electrode plate, a second electrode plate, and a separator between the first electrode plate and the second electrode plate;
   a first collecting plate electrically connected to the first electrode plate, the first collecting plate including a first fuse region;
   a second collecting plate electrically connected to the second electrode plate, the second collecting plate including a second fuse region; and
   a case accommodating the electrode assembly, the first collecting plate, and the second collecting plate,
   wherein a first sectional area of the first fuse region is larger than a second sectional area of the second fuse region.

2. The secondary battery as claimed in claim 1, wherein the first sectional area is about 2 to about 9 times larger than the second sectional area.

3. The secondary battery as claimed in claim 1, wherein:
   the first fuse region includes at least one first fuse hole, and
   the second fuse region includes at least one second fuse hole.

4. The secondary battery as claimed in claim 3, wherein the first fuse hole has a size smaller than a size of the second fuse hole.

5. The secondary battery as claimed in claim 3, wherein a first distance between an outer edge of the first fuse hole and an outer edge of the first fuse region is larger than a second distance between an outer edge of the second fuse hole and an outer edge of the second fuse region.

6. The secondary battery as claimed in claim 3, wherein a number of first fuse holes is smaller than a number of second fuse holes.

7. The secondary battery as claimed in claim 6, wherein each first fuse hole has a same size as each second fuse hole.

8. The secondary battery as claimed in claim 3, wherein the first collecting plate further includes a first fuse protrusion extending from at least one side part of the first fuse region adjacent to the first fuse hole.

9. The secondary battery as claimed in claim 3, wherein the second collecting plate further includes a second fuse protrusion extending from at least one side part of the second fuse region adjacent to the second fuse hole.

10. The secondary battery as claimed in claim 1, wherein:
    the first fuse region having the first sectional area includes a first fuse lead having a first fuse lead sectional area smaller than another sectional area of other regions of the first collecting plate other, and
    the second fuse region having the second sectional area includes a second fuse lead having a second fuse lead sectional area smaller than another sectional area of other regions of the second collecting plate.

11. The secondary battery as claimed in claim 10, wherein:
    the first fuse lead and the second fuse lead have a same width in one direction, and
    the first fuse lead has a first thickness in another direction orthogonal to the one direction, the second fuse lead has a second thickness in another direction orthogonal to the one direction, and the first thickness is larger than the second thickness.

12. The secondary battery as claimed in claim 10, wherein:
    the first fuse lead and the second fuse lead have a same thickness in one direction, and
    the first fuse lead has a first width in another direction orthogonal to the one direction, the second fuse lead has a second width in another direction orthogonal to the one direction, and the first width is greater than the second width.

13. The secondary battery as claimed in claim 10, wherein:
    the first fuse lead has a thickness larger than a thickness of the second fuse lead, and
    the first fuse lead has a width larger than a width of the second fuse lead.

14. The secondary battery as claimed in claim 1, further comprising a first electrode terminal electrically connected to the first electrode plate and the case.

15. The secondary battery as claimed in claim 14, wherein the first collecting plate includes:
    a first connecting part coupled with the first electrode terminal, and
    a first extending part extending from the first connecting part and coupled with the first electrode plate.

16. The secondary battery as claimed in claim 15, wherein the first fuse region is positioned at the first connecting part.

17. The secondary battery as claimed in claim 1, further comprising a second electrode terminal electrically connected to the second electrode plate.

18. The secondary battery as claimed in claim 17, wherein the second collecting plate includes:

a second connecting part coupled with the second electrode terminal, and a second extending part extending from the second connecting part and coupled with the second electrode plate.

19. The secondary battery as claimed in claim 18, wherein the second fuse region is positioned at the second connecting part.

20. The secondary battery as claimed in claim 1, further comprising a cap assembly coupled with the case, the cap assembly including:

a cap plate coupled with an opening of the case, the cap plate including a short circuit hole;

a first short circuit plate in the short circuit hole of the cap plate; and a second short circuit plate spaced apart from a top surface of the cap plate, facing the first short circuit plate, and being electrically connected to the second electrode plate.

* * * * *